Figure 2:
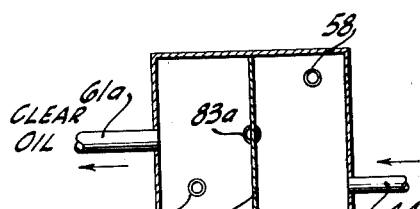

May 26, 1953 — C. H. O. BERG — 2,640,014
OIL-SHALE EDUCTION PROCESS AND APPARATUS
Filed Jan. 31, 1949

INVENTOR.
CLYDE H. O. BERG,
BY Ross J. Garofalo
ATTORNEY.

Patented May 26, 1953

2,640,014

UNITED STATES PATENT OFFICE 2,640,014

OIL-SHALE EDUCTION PROCESS AND APPARATUS

Clyde H. O. Berg, Long Beach, Calif., assignor to Union Oil Company of California, Los Angeles, Calif., a corporation of California Application January 31, 1949, Serial No. 73,858

9 Claims. (Cl. 202—6)

This invention relates to a process and apparatus for the continuous treatment of carbonaceous solids for the recovery of gas and liquid products therefrom and in particular is directed to a process and apparatus for the recovery of hydrocarbon gases and liquids from such carbonaceous solids as oil shale, tar sand, diatomite, various types of coal such as bituminous and sub-bituminous coals, and the like.

The recovery of hydrocarbon gases and liquids from oil-bearing or oil-producing solids is well known, and according to the previously proposed processes this recovery is generally accomplished by subjecting the solid to sufficiently high temperatures to separate the oils and gases from the mineral matter. These conventional processes have not been particularly satisfactory since in general considerable quantities of heat are required which often consumes the entire quantity of gas produced during the eduction process and sometimes considerable electrical energy as well. In addition, a large number of the conventional processes are unable to treat oil-bearing or oil-producing solids which are finely divided thus requiring a considerable contact time to effect an eduction of appreciable quantities of oils and gases from these necessarily large solid particles. Higher temperatures are also required in order to minimize the lengthy contact time necessary and as a result an undesirably large proportion of the educted oil produced is thermally decomposed destroying a large proportion of the higher molecular weight and higher-boiling substances.

The improved process of the present invention comprises a procedure for treating oil-bearing solids by means of which most of the heretofore objectionable features of the conventional processes are eliminated. The present invention further comprises an improved apparatus for the treatment of oil-bearing or oil-producing solids which is much improved over the conventional apparatuses in all its simplicity of construction and operation.

It is a primary object of the present invention to provide an improved process for the recovery of gaseous and liquid products from oil-bearing or oil-producing solids in which such products are recovered at temperatures below those at which thermal pyrolysis occurs and under conditions conducive to minimizing undesirable decomposition of the liquid fraction of the products in particular.

Another object of the present invention is to provide an improved process for the recovery of hydrocarbon gases and liquids from carbonaceous solids of small particle size may be efficiently treated.

An additional object of the present invention is to provide a process for the recovery of shale oil and shale gases from oil shale, the operation of which is substantially as efficient when performed on oil shales of high oil content as when performed on shales of low oil content.

It is a further object of this invention to provide an improved process in which a considerable improvement in the recovery of normally liquid hydrocarbon products from the eduction gases is effected by the use of elastic mechanical vibrations.

It is also an object of this invention to provide a process for recovering oils and gases from such as oil shales in which the mineral residue is heated to fusion temperatures following eduction and in which slagging may be controlled by varying the oxygen concentration of the reactant gases.

An additional object of the present invention is to provide an improved process in which the ash slagging problems arising during the treatment of oil shales containing relatively high oil contents and the ash dusting problems arising during treatment of oil shales containing relatively low oil contents are substantially eliminated through the use of an improved method of agitating the solids as hereinafter more fully described.

Another object of the present invention is to provide an improved apparatus for the recovery of gaseous and liquid eduction products from carbonaceous solids such as oil shale containing particles smaller than about 50 mesh.

An additional object of this invention is to provide an improved apparatus which is particularly well adapted to the recovery of hydrocarbon gases and oils by the eduction of oil shale, and the like, in which heat is supplied solely from the combustion of at least a part of the carbonaceous spent shale remaining after the hydrocarbon oil and gases have been educted.

It is a further object of this invention to provide an apparatus for oil shale eduction by means of which a substantially complete recovery of shale oils and gases may be effected from oil shales regardless of the oil content of the oil shale feed.

Other objects and advantages of the present invention will become apparent to those skilled in the art as the description thereof proceeds.

Briefly, the present invention comprises a process and apparatus for the recovery of gaseous and liquid products from oil-bearing or oil-producing solids. This process is particularly well adapted to treatment of oil shales. The carbonaceous solid is introduced into a hopper zone and is subsequently passed through a seal of liquid eduction product into a feeder zone substantially without the simultaneous introduction of air herewith. The solids are then passed upwardly through a treating zone containing an eduction zone and a burning zone. In the eduction zone the oil shale is directly and counter-currently contacted with a hot eduction medium which effects the substantially complete eduction of gaseous and liquid products from the solid leaving a combustible carbonaceous residue. The carbonaceous residue is subsequently contacted with an oxygen-containing gas in the burning zone and a substantially complete combustion of the carbonaceous material is effected forming the hot eduction medium previously mentioned and leaving a carbon-free ash. The solids in the ash zone and in the burning zone are continually agitated for purposes of facilitating gas preheating, temperature control, and the elimination of difficulties arising from ash slagging in the burning zone. The ashes are discharged from the upper portion of the treating zone.

The oxygen-containing gas is drawn downwardly in countercurrent contact with the ashes and is subsequently introduced into the burning zone. The hot eduction medium formed in the burning zone is drawn downwardly through the eduction zone. The gaseous and liquid products of eduction and products of combustion are disengaged from the upwardly moving bed of solids and pass into an accumulation zone comprising a shell surrounding the lower portion of the treating zone. In this accumulation zone, which communicates with the hopper zone previously described, the gases and liquids are separated and a level of liquid eduction products is maintained forming the seal mentioned above through which the oil-producing solids are introduced. Gaseous and liquid products formed in the treating zone may be withdrawn from the accumulation zone together, or they may be withdrawn as independent gas and liquid phases.

The process of this invention, as above briefly described, may be applied to the recovery of hydrocarbon gases and oils from oil shales and other oil-producing solids, from tar sands, diatomite, and other oil-containing solids, from such other carbonaceous materials as bituminous coal. The process of this invention may also be applied to the recovery of hydrocarbon oils and gases from carbonaceous solids such as coal in which an incomplete combustion of the carbonaceous residue is preformed for the production of coke which is removed from the upper portion of the treating zone mentioned above. If desired, the apparatus of this invention may be operated under superatmospheric pressure under conditions conducive to the reaction of oxygen, water vapor, and carbon dioxide with the carbonaceous residue for the formation of substantial quantities of carbon monoxide and hydrogen in addition to the hydrocarbon gaseous and liquid products as described above. In this modification the carbonaceous residue is gasified with the formation of a gaseous mixture which is well suited to use as a feed stream in the well known catalytic processes for carbon monoxide hydrogenation.

The accompanying drawings are included to facilitate description of the process and apparatus of this invention and to show with clarity its mechanical construction and fully depict the procedures for its operation.

Figure 1:
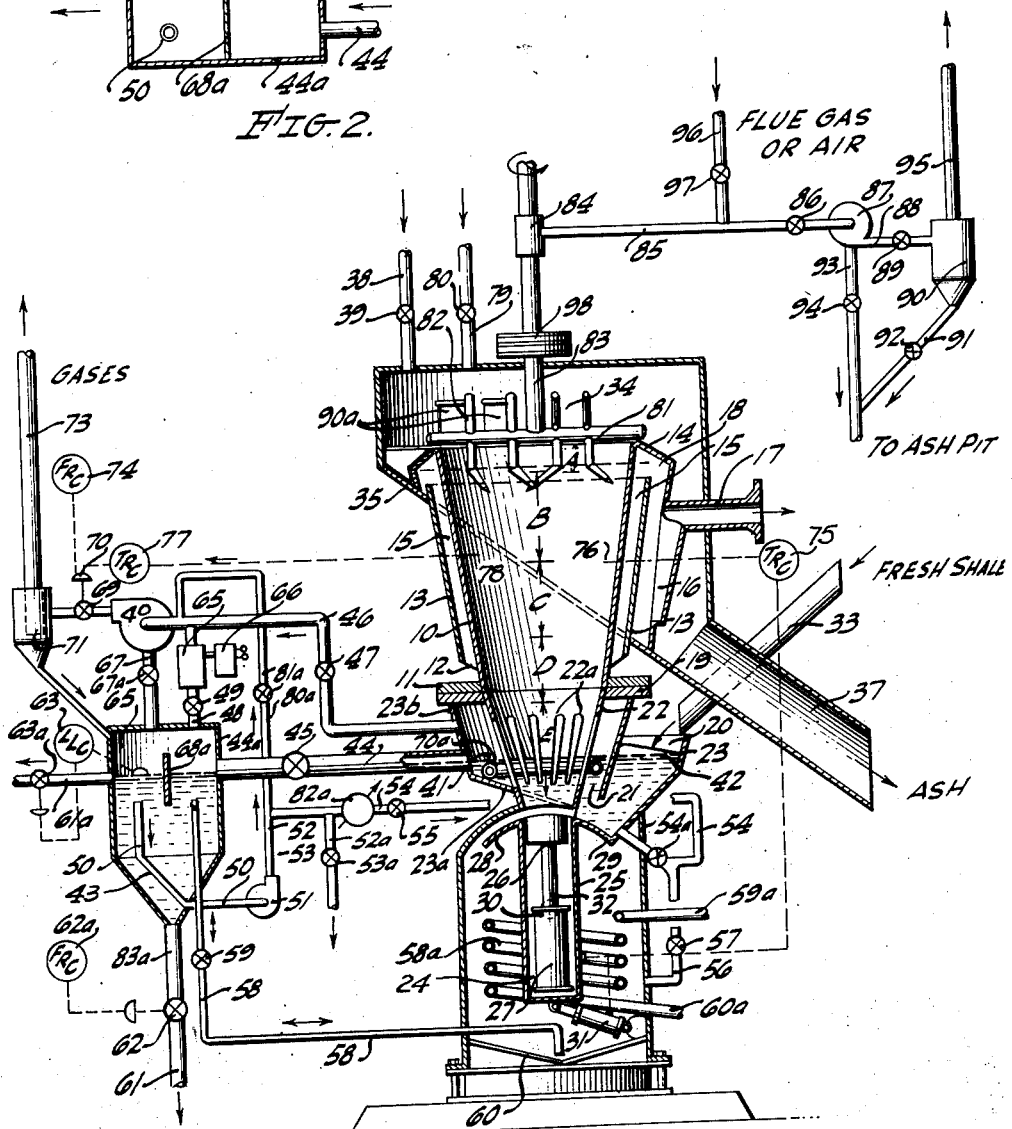

Figure 1 comprises a schematic flow diagram and vertical cross section of the apparatus involved in the process of this invention for the treatment of carbonaceous solids.

Figure 2 shows a plan view of separator 44a shown in Figure 1.

Referring now more particularly to Figure 1, conical treating kiln 10 is shown with the larger diameter at the top. Kiln 10 is open at its upper end where ashes and other residues are removed. It is further provided with radial fins 12 on the outside surface and with shell 13 extending around the outward edges of fins 12. An annular gas space 15 is thus provided between kiln 10 and shell 13 through which a gas such as air or other fluid medium may be circulated to facilitate cooling of the walls of the kiln and to maintain on the inner surface of kiln 10 a relatively cool layer of shale, at a temperature below about 400° F. Collar 14 is integrally attached to the upper end of kiln 10 and extends downwardly outside of shell 13 to reverse the flow of gases passing upwardly through space 15. Manifold 16 is further provided together with outlet 17 so that the cooling gases enter jacket 15 just above flange 11, pass upwardly between the radial fins through jacket 15, reverse direction at the upper end of jacket 15 below collar 14, and are collected in space 18 from which they are removed by means of manifold 16 and discharged through line 17. Gases passing through jacket 15 in the manner described preferably comprise atmospheric air moved by natural convection, although forced convection may be employed, if desired. This is not necessary under normal operation in which oil shale is the oil-producing solid being treated. The warm gases thus produced leave line 17 at a temperature above about 250° F. and may be employed as preheated air to furnaces, for introduction into the kiln as an oxygen-containing gas to effect burning of carbonaceous materials therein, or other uses.

Flange 11 faces directly upon flange 19 by means of which the upper structure of the apparatus is attached to the lower part of the structure. The lower part of the structure is, in the modification shown, essentially cylindrical except for accumulation zone 21 and hopper zone 20 through which fresh oil-bearing or oil-producing solids to be treated are introduced. Conical section 22 is provided with apertures 22a to form disengaging zone E by means of which gases and liquids may be removed from the inside of treating kiln 10 into accumulation zone 21. Conical section 22 is aligned on the same axis as treating kiln 10. Baffle 23 comprises that part of housing 23b surrounding conical section 22 which is adjacent to hopper zone 20 and is positioned between accumulation zone 21 and hopper zone 20. This baffle extends downwardly into a body of liquid maintained in the lower portion of accumulation zone 21. A liquid seal is thus provided which permits passage of liquid below baffle 23 between accumulation zone 21 and hopper zone 20 but prevents the introduction of air or other gases from hopper zone 20 into kiln 10 along with the oil-bearing solids to be treated. The presence of this liquid seal is highly important since the formation of dangerous mixtures of air and hydrocarbon or other combustible gases is thus prevented.

Positioned immediately below hopper zone 20 and accumulation zone 21 is solids feeder housing 24, which is filled with liquid products of eduction, water or other. Within this zone is submerged a mechanical feeding mechanism adapted to the removal of oil-forming or oil-bearing solids from hopper zone 20 and the discharge of these solids upwardly through conical section 22 and through the other zones of vertical treating zone 10 as hereinafter more fully described. The particular apparatus which has been found well adapted to perform this continuous introduction of solids is shown in the drawing. This vertically acting solids feeder comprises cylinder 25 provided with piston 26 actuated by hydraulic cylinder 27. Guards 28 and 29 are further provided to seal the lower openings of conical section 22 and hopper zone 20 as cylinder 25 oscillates back and forth from its vertical position below conical section 22 to its angular position below hopper 20 about trunnion 30. The clearances between guards 28 and 29 and conical section 22 are preferably less than about 0.005 inch to prevent solid fines from entering housing 24. To effect this oscillatory motion of cylinder 25 of the vertically acting feeder, hydraulic cylinder 31 is provided. The action of hydraulic cylinders 27 and 31 is synchronized by pilot valves positioned adjacent to cylinders 27 and 31 and which actuate a master hydraulic cylinder, not shown, which in turn controls the introduction and removal of the hydraulic fluid with hydraulic cylinder 27 so that the following sequence of events in the solids feeder will occur:

1. Hydraulic cylinder 31 rotates cylinder 25 about trunnion 30 from the position shown to its angular position below hopper 20 while guard 28 seals the lower opening of kiln 10.

2. Hydraulic cylinder 27 lowers piston 26 in cylinder 25 leaving a free space in the upper portion of cylinder 25 which accepts a charge of solids from hopper 20.

3. Hydraulic cylinder 31 acts to restore cylinder 25 to its vertical position below eduction kiln 10 while guard 29 seals the lower opening of hopper 20, and 4. Hydraulic cylinder 27 acting through connecting rod 32 forces piston 26 upwardly through cylinder 25 thereby injecting the solids upwardly through conical section 22 and displacing the remaining solids upwardly through kiln 10, thus repeating the cycle.

During operation, the reciprocation of piston 26 in the feeder mechanism displaces liquid present in accumulation zone 21 into reservoir 43. To avoid the pulsating flow which would result line 58 is provided whereby the liquid displaced by piston 26 is replaced by clarified liquid flowing from reservoir 43 through line 58 into housing 24. The liquid subsequently passes in the reverse direction returning settled solids fines from housing 24 into reservoir 43. This pulsating flow insures the maintenance of housing 24 in a solids fines-free condition even when fluid is not flushed therethrough via lines 56 and 58 as described below.

This mechanical solids feeder is more clearly described, illustrated and claimed in copending patent application Serial No. 752,757 filed June 5, 1947.

The remainder of the description of the apparatus shown in this figure, Figure 1, will be conducted as a practical example in which the oil-bearing or oil-producing solid comprises oil shale which may contain as low as about 10 gallons of oil to as high as about 75 or 100 gallons of oil per ton of fresh oil shale. The quantity of oil which may be produced from a particular oil shale determines somewhat the mode of operation of the kiln as hereinafter more fully described.

Oil shale is continuously introduced by means of conduit 33 into hopper zone 20 wherein it is saturated with the liquid products of eduction maintained as a seal in the bottom thereof. By means of the mechanical feeder described above, the fresh oil shale is passed from hopper zone 20 upwardly through the treating zone which comprises vertical kiln 10 and conical section 22 which are positioned on the same vertical axis and communicate with one another. The fresh oil shale is passed upwardly through the treating zone successively through disengaging zone E, solids preheating zone D, eduction zone C, burning or combustion zone B, and ash zone A. The ash present in ash zone A and the burning material in zone B is continuously agitated by means of a rotary agitating mechanism 34 hereinafter more fully described and displaced from the upper portion of kiln 10 from which it falls to impinge toward the upper surface of baffle 35. Baffle 35 comprises the lower surface of agitator housing 36 which encloses the entire upper portion of the apparatus and from the lower portion of which conduit 37 is provided. The slope of baffle 35 is sufficient to cause the displaced ashes to slide freely through conduit 37 for introduction into any suitable apparatus, not shown, for disposal or other use.

An oxygen-containing gas such as air, oxygen-enriched air, or flue gas containing excess oxygen and the like is introduced into agitator housing 36 by means of line 38 controlled by valve 39. This may be heated air previously circulated through space 15. This gas may be introduced under pressure by means of a blower, not shown, or in the preferred modification is drawn downwardly through eduction kiln 10 by blower 40 which evacuates gases accumulating in the upper portion of accumulation zone 21. This method of operation gives rise to the formation of a difference in liquid levels 41 and 42 across baffle 23 forming the seal previously mentioned through which oil shale may be introduced without contaminating the gases in accumulation zone 21 with air.

The oxygen-containing gas such as air, passes downwardly through ash zone A in direct countercurrent contact thus cooling the ashes and preheating the air. The thus preheated air passes into burning zone B in which the carbonaceous residue remaining following eduction of shale oil and gases in eduction zone C is burned. The ash passing upwardly through zone B to zone A is substantially carbon free and the hot flue gases formed comprise a hot eduction medium which passes directly down into eduction zone C.

The hot eduction medium countercurrently contacts the upwardly rising oil shale, heating it to eduction temperatures of between 500° F. and 1,000° F. thereby educting substantially all of the shale oils and shale gases from the rich oil shale leaving a spent shale as a carbonaceous residue. In general, this oil and gas eduction takes place at temperatures between about 600° F. and 800° F., temperatures which do not cause undue thermal decomposition of the hydrocarbon and other products educted from the oil shale. These educted liquids and gases pass downwardly from eduction zone C together with the cooled eduction medium, products of combustion, and enter zone D while the spent carbonaceous shale residue continues upwardly into zone B where the burning of carbonaceous materials form additional quantities of the hot eduction medium.

The products of combustion and liquid and gaseous products of eduction pass downwardly through preheating zone D countercurrent to the upwardly rising oil shale. Since the gases and liquids contact the solids directly a highly efficient interchange of heat is effected in which the gases are cooled and additional liquids are condensed as well as subcooling the liquid products educted in zone C. In this direct contact the upwardly rising oil shale is preheated to temperatures as high as 300° F. to 500° F. at which temperature they enter eduction zone C.

The cooled gaseous and liquid products of combustion and eduction pass downwardly into disengaging zone E previously described which comprises a perforated conical section 22 adapted to the upflow of oil shale and adapted to disengaging liquids and gases from the upwardly moving bed of solids. Preferably, liquid level 41 is maintained so as to cover somewhat less than about 50% of the area of apertures 22a to thus permit unimpeded gas flow therethrough. These liquids and gases pass from disengaging zone E directly into accumulation zone 21 establishing liquid level 41 therein and liquid level 42 in hopper 20.

An important feature of the operation of the feeder mechanism in conjuction with conical section 22 is the fact that a continuous recirculation of fines is accomplished. These materials are the particles which are sufficiently small to drop through perforations 22a in conical section 22 into accumulation zone 21. The smaller fines do not settle readily from the oil and are removed with it to separator 44a while the large particles settle along surface 23a into hopper 20 and are recirculated with the feed or are withdrawn via line 44 with the educted oil. The oil shale is wet with liquid products of eduction and some of these fines are lifted upwardly therewith through the treating zone. The action of the vertical acting solids feeder enhances the ability of the apparatus to treat oil shales containing an appreciable quantity of fines due to its vertical displacement of solids continuously in an upward direction. Those larger fines which tend to settle out of the treating zone and those which pass through perforations 22a into accumulation zone 21 and hopper zone 20 and settle rapidly to the bottom thereof are reintroduced by the feeding mechanism upwardly through the treating zone with the next charge of shale passed from hopper zone 20 upwardly through conical section 22. Zone 21 may be provided with a conical or otherwise sloping bottom 23a to enable the settling fines to progress toward the bottom of hopper 20 so they may be reinforced with the feed.

The lower portion of accumulation zone 21 as well as the entire inner volume of housing 24 surrounding the feeder mechanism is filled with liquids which are preferably the liquid products of eduction. In this manner, the temperature of the lower portion of the apparatus is kept well below eduction temperatures, such as from about 100° F. to about 300° F. Heating means 70a which may be a steam coil is provided to heat the products of eduction, keep them fluid, and assist in preheating the fresh solids. Heating means 58a provided with connections 59a and 60a are provided to keep the fluid in feeder housing 24 sufficiently fluid to prevent impeding the feeder action. This heating may also be accomplished by passing a circulation of liquid through line 52 from reservoir 43 through heater 82a into the liquid body maintained in zones 20 and 24 and back to reservoir 43.

A partial separation of the gaseous and liquid products is effected in accumulation zone 21 and these separated phases may be withdrawn individually or together as desired. In one modification of the present invention reservoir 43 having baffle 68a is provided which communicates with accumulation zone 21. A plan view of reservoir 43 is shown in Figure 2 wherein the same parts are designated with the same reference characters as in Figure 1.

The liquid and gaseous products in accumulation zone 21 are drawn into the reservoir 43 by means of line 44 controlled by valve 45 under the influence of blower 40. In this modification the gas and liquid phase are removed from accumulation zone together. However, if desirable, the gas products may be drawn from accumulation zone 21 under the influence of blower 40 by means of line 46 controlled by valve 47 in which case the liquid products flow from accumulation zone 21 into reservoir 43 under their own fluid head. In this latter modification line 48 connecting blower 40 with reservoir 43 is shut off by closing valve 49.

The liquid eduction products collect in reservoir 43 and establish a level approximately equal to that present in accumulation zone 21. The liquid level in reservoir zone 43 is maintained by level control 63 which in turn controls valves 63a in clear oil product line 61a from which the oil product free of fines is removed from reservoir 43. The liquid level 41 in accumulation zone 21 is also thus controlled since the two zones (43 and 21) directly communicate with one another through line 44 or line 58 and lines 54 and 56. In order to remove accumulations of fine solids in accumulation zone 21 or within feeder zone housing 24, a portion of the liquid products are recirculated through these zones into reservoir 43 where they are allowed to separate as desired. Clear liquid products of eduction are removed from the upper part of reservoir zone 43 by means of line 50 and are pumped by means of pump 51 through line 52 controlled by valve 53 and divided into three portions. The first of these may be passed into the bottom of accumulation zone 21 through line 54 controlled by valve 55 to assist normal fines removal previously described from whence the fines are returned to reservoir 43 to settle out. The second of these enters the upper portion of feeder housing 24 by means of line 56 controlled by valve 57. The third passes via line 80a controlled by valve 81a into the inlet to blower 40 to assist in agglomeration of suspended liquid mists. The first portion of oil circulates upward through the body of liquid in accumulation zone 21 suspending fine particles which then flow through line 44 for deposition in reservoir 43. The second portion of oil passes into feeder housing 24 and escapes therefrom through line 58 controlled by valve 59 into reservoir zone 43. The fine solids, if any, settling in feeder housing 24 are directed to a point immediately below the oil entry point of line 58 by means of conical baffle 60 and are thus swept out of housing 24 through line 58 and deposited in reservoir 43. The third portion is employed with specially designed blowers known as Rotoclones as blower 40 to recover liquid mists in conjunction with reservoir 43. A portion of clear product may be withdrawn via line 52a from line 52.

The liquid products of eduction are continuously removed from reservoir 43 by means of line 61a controlled by automatic control valve 63a which in turn is actuated by liquid level controller 63. The rate of oil removal from reservoir 43 is equal to rate of oil eduction maintaining a dynamic fluid equilibrium in the system in which liquid level 41 is such that a seal is maintained across baffle 23. The oil product thus formed is sent by means of line 61a to storage or further processing facilities not shown. A small portion of oil product containing separated fines is withdrawn via line 83a controlled by valve 62 which in turn may be actuated by flow controller 62a. In another modification, separator 44a is provided with a combined rake-type solids classifier to remove fines with a minimum of occluded oil from the bottom of the separator.

Under the influence of blower 40 gaseous products of eduction and of combustion are withdrawn from accumulation zone 21. In one modification, these gases may be subjected to the effects of sonic and ultrasonic mechanical vibrations to increase the degree of separation of normally liquid products from the gas phase. In this modification valve 47 is closed and valve 49 is opened permitting the gases and liquids to flow simultaneously from accumulation zone 21 through line 44 controlled by valve 45 into reservoir zone 43. These gases and entrained liquid mists leave reservoir zone 43 via line 48 controlled by valve 49 into vibration chamber 65 wherein they are subjected to intense sonic and ultrasonic mechanical vibrations generated by sound generator 66. It is preferable that this sound generator be capable of generating high intensity sonic or ultrasonic vibrations having intensities of as high as about 175 decibels in the frequency range of from about 1000 cycles per second to as high as 200,000 cycles per second or higher.

Although sonic vibrations may be generated in several ways, namely, through the action of alternating currents on crystals showing the piezoelectric effect, or the action of alternating current on coils wound over metal cores, it is preferable, because of the high intensity vibrations required, that generator 66 be of the type which generates the required vibrations through the use of a rotary mechanical device of the siren type. By means of this type of device mists comprising suspended liquid particles of minute size may be violently vibrated with vibrations of intensity sufficient to cause agglomeration of these mists into liquid particles of sufficiently large size to permit ready separation from the gas by gravity or centrifugal means.

Such separated shale oil is recovered in blower 40 and passes to the body of liquid in reservoir 43 via line 67 controlled by valve 67a.

The gas phase removed from accumulation zone 21 contains some finely divided liquid particles similar to a fog or mist. It is desirable to recover these normally liquid constituents. The preferred modification for mist recovery is one in which the gases are first subjected to the sonic vibration treatment to agglomerate suspended liquid particles and then to centrifugal separation as in blower 40.

The gas containing agglomerated liquid particles passes from vibration chamber 65 through line 48 controlled by valve 49 into blower 40 wherein, besides drawing gases from reservoir 43, effects a further centrifugal agglomeration of the particles. The liquid thus recovered is drawn from the case of blower 40 by means of line 67 and is returned to the main liquid body present in reservoir 43. The gases pass, under pressure developed by blower 40, through line 69 controlled by control valve 70 to centrifugal separator 71 wherein remaining traces of suspended particles are recovered. These separated particles drain by means of line 72 back into reservoir 43 with the main oil product. The gases, now free of suspended material, pass by means of line 73 to storage or further processing not shown. This gas comprises a mixture of flue gas constituents as well as educted hydrocarbon constituents and is worthy of separation to recover the individual components. Such separation may be effected by absorption, distillation, selective adsorption, or other means. The separated flue gases may be recycled for passage downwardly through the burning zone supplementing the volume of hot eduction medium employed in zone C, and the remainder may be vented. The hydrocarbon constituents may be employed as fuel or any chemical synthesis or for other use.

Continuous process control of the position of burning zone B may be maintained by controlling the rate at which the solids to be treated are introduced into the kiln, by controlling the rate at which the product gases are removed which determines the rate of oxygen-containing gas introduction, by controlling the composition of gases introduced into the top of the kiln, and the like. These control methods may be used in combination with one another, if desired, or individually. These control methods used in conjunction with the method for agitating the solids in the ash and burning zones result in a process of unusually high efficiency for the treatment of oil-bearing or oil-producing solids. Preferably, the burning zone B is maintained at such a position that plows 82 extend well into the burning solids to insure complete and efficient combustion.

Control of the solids input rate by the reciprocating vertically-acting solids feeder has been described above and control of the product gas removal rate may be obtained readily by adjustment of control valves 69 on the outlet line of blower 40. The variation of the inlet gas composition may be widely varied by a number of procedures. The oxygen-containing gas may be enriched with added oxygen to raise the combustion temperature and the combustion rate. If desired, air, oxygen-enriched air, or pure oxygen may be employed. In gasification operations, pure oxygen and steam are desirable as the reactant gas mixture introduced. In other modifications, flue gas or other gases including educted hydrocarbons may be recycled through the treating zone to provide a measure of heat control. Usually, sufficient carbonaceous residue remains after educting shale oils and gases to provide more than the required heat and air alone is introduced. To reduce the temperature and rate of combustion, steam or flue gas may be recycled in the proper ratio to give the desired reduction. Gases containing from as low as 10% to as high as 90% recycled gas or steam may be used with air depending upon the particular operation. Control of the burning zone may also be affected by the withdrawal or introduction of gases through the conduit in the plow mechanism, and by the cooling effect resulting from circulation of the fluid heat transfer medium within the plows as hereinafter more fully described.

In one desirable modification, the flow rate at which gases are removed from accumulation zone 21 is maintained at a constant value by means of flow recorder controller 74 which in turn actuates control valve 69 positioned in the outlet line of blower 40. The rate at which oil shale or other oil-producing solids passes upwardly through the treating zone is then controlled by temperature recorder controller 75 acting to control the solids delivery rate of the feeder mechanism in feeder zone 24 in accordance with the position in kiln 10 of burning zone B. Thus, when a solids flow rate which is too low for a required output of gas is encountered, the burning zone present in zone B tends to lower its position. This condition is detected by temperature recorder controller 75 through thermocouple point 76 and the solids feeder is actuated to increase the solids flow rate thus restoring the burning zone B to its desired position in kiln 10.

In another modification of control, the solids delivery rate of feeder 24 is maintained at a constant value and temperature recorder controller 77 actuated by thermocouple point 78 varies the rate at which gases are withdrawn from accumulation zone 21. Thus, when the position of burning zone B tends to change above or below its desired position, the condition is detected by thermocouple 78 which increases or decreases the gas flow rate by controlling blower 40 and either increasing or decreasing the burning rate appropriately to restore the position of the burning zone to its desired position. The temperature gradient in the kiln reaches a maximum in the combustion zone and the thermocouple is preferably positioned above or below this maximum point. Two couples may be used, one above and one below in this service.

It is also possible to operate the apparatus with the combustion zone at the uppermost part of the kiln. This permits direct heat loss principally by radiation from the hot shale particle and allows deeper penetration of the plows into the combustion zone.

The process and apparatus of the present invention as shown in Figure 1 eliminates two of the principal operation difficulties which manifest themselves in oil shale retorting. The first of these is a condition characteristic of oil shales with relatively high oil contents, such as about 40 U. S. gallons per ton and higher. This difficulty is one in which the carbon content of the spent shale is sufficiently high to generate an excess of heat during the carbon burn-off step in the formation of the hot eduction medium to cause incipient fusion of the shale ash. These slagging conditions are such to inhibit the free flow of oxygen-containing gas downwardly through the burning zone. The second difficulty encountered in processes involving burning the carbonaceous shale residue is one peculiar to oil-shales containing relatively low oil contents, that is, less than about 30 U. S. gallons per ton. This condition involves the excessive formation of dust from ashes produced in the burning zone. This dust is easily suspended in the gas flow and tends to smother or otherwise inhibit the free burning of the carbonaceous residue in the burning zone below. These difficulties have been substantially eliminated by the apparatus shown in cross section in the upper portion of the treating zone shown and previously described in Figure 1. This apparatus subjects the ash in ash zone A and particularly the burning residue in burning zone B to moderate agitation by the action of rotary plows extending downwardly as much as 36 inches into the bed. These plows rotate about the center vertical axis of the kiln. The effect of this agitation is to prevent slagging conditions in the burning zone B from inhibiting free gas flow through the system when rich oil shales and the like are treated. The plows are further adapted to removal of a portion of the heat from burning zone B which increases the control maintained over the position of the burning zone by preventing it from rising to the top of the bed. This effect is achieved since the solids are maintained in an agitated condition and a free flow of oxygen-containing gas downwardly therethrough is insured. For processing domestic oil shales, slagging conditions are encountered between about 2,000° F. and about 3,000° F., depending upon the mineral constitution of the material. In this type of operation the burning zone is maintained between a transverse plane above the lower extremities of the plows and a transverse plane approximately at the position of the thermocouples 76 and 78. This lower extremity is somewhat variable since the control temperatures of temperature recorder controller 75 and 77 may be varied.

In another modification, thermocouples 76 and 78 may actuate controllers to vary the rate of oxygen-containing gas and steam introduction to control the burning zone position and its temperature.

The rotary plow mechanism is further provided with a conduit which is operated under a pressure less than that existing within the apparatus and consequently a flow of gas from the bed of ashes in ash zone A into the aforementioned conduit occurs permitting the removal of a substantial proportion of fine ashes which are detrimental to the maintenance of smooth burning conditions in burning zone B.

Thus, the combination apparatus shown in Figure 1 is well adapted to the efficient recovery of gaseous and liquid products of eduction and to the smooth control of the eduction process regardless of the oil content of the oil-bearing or oil-producing solids which are employed.

The mechanism for agitating the solids in ash zone A and combustion zone B is shown as rotary agitating mechanism 34. This mechanism is provided with a system of cross arms 81 to which are attached plows 82 extending downwardly through ash zone A into burning zone B. Plows 82 are hollow and provided with means for the circulation of a heat transfer medium to remove heat from the plows and radiate it away from surfaces 90a. Plows 82 are further provided at their lower extremities with abrasion resistance and heat resistant tips of alloy steel, carbide, or other material. Cross arm 81 is integrally attached to shaft 83 by means of which the rotary motion is transmitted from a suitable driving means not shown. Shaft 83 is hollow and connected with the conduit previously described in plows 82 by means of which dust particles are withdrawn from ash zone A. This suspension of particles passes upwardly through the conduit into cross arm 81, upwardly through shaft 83 provided with heat radiator 98, through rotary coupling 84, and through line 85 controlled by valve 86, and is introduced by means of blower 87 through line 88 controlled by valve 89 to centrifugal separator 90 wherein suspended fine ash particles are separated. The separated ash fines pass via line 91 controlled by valve 92 to be combined with ash fines separated continuously from an especially designed case in blower 87 via line 93 controlled by valve 94. These ashes are disposed of together with ashes removed via conduit 37 from chamber 36 previously described. The gas, freed of suspended ash fines, is removed from separator 80 via line 95 and is disposed of, if desired, or recirculated into chamber 36 with incoming oxygen-containing gas through line 38 controlled by valve 39.

During the operation in which ash slagging problems exist it is generally unnecessary to operate the evacuating system just described since the evacuating system provides means for ash dust removal. Such dust is in most cases only formed at lower temperatures with lean shales or other solids when slagging is not often encountered. In this case, valve 86 may, if desired, be closed and flue gas or air or steam or other gas may be introduced via line 96 controlled by valve 97 to flow in the reverse direction through the evacuating system described above. These gases, therefore, pass outwardly through shaft 83 and enter the burning zone directly through the openings provided in plows 82. This reversal of gas flow serves to introduce cool oxygen-containing gas directly into the burning zone, to control the position of the burning zone, and prevent undue heating of the evacuation conduit.

The structural details and operating data for the agitating means is more clearly described and claimed in co-pending application Serial No. 30,423 filed June 1, 1948.

As an example of typical operation of the improved apparatus according to this invention, the following data are given:

Example I

The apparatus had a capacity of 1.75 tons of crushed shale per day. The oil shale was obtained from the Parachute Creek District of Garfield County, Colorado. The shale was introduced at a rate of 103.5 pounds per hour through the oil seal, which had a temperature of about 120° F. A total quantity of 587.3 pounds of shale was fed during the run and from this material was obtained 100.7 pounds of shale oil and 342.1 pounds of ashes. The remaining material was produced as gas.

The shale passed into the kiln at a temperature of 100° F. and the oil and gases were educted at temperatures below 850° F. The maximum temperature in the burning zone was 2250° F. and the ash was removed from the kiln at 600° F. after preheating incoming air.

The ash agitating mechanism was rotated at slightly less than one revolution per minute and an unimpeded air flow through the bed of ash and a steady carbon burn-off was maintained at all times. The plows and radiation chambers were partially filled with metallic sodium to assist in heat dissipation. No trouble was encountered due to ash slagging as before when no ash agitation had been employed.

The gas circulating through the kiln jacket was vented to the atmosphere at a temperature of about 275° F. to 285° F. during the run.

Air was introduced through the evacuation conduit directly into the kiln to aid cooling of the plows.

Example II

The apparatus above described was applied to the coking of bituminous coal. The coal contained 79% carbon and was introduced at a rate of 1.63 tons per day or 136 pounds per hour. Controlled quantities of air were introduced limiting the maximum temperature to about 1300° F. The coke yield was 1.22 tons per day or 102 pounds per hour. The tar yield was about 20.4 gallons per day and about 95 cubic feet per hour of gas was produced which had a heating value of about 575 B. t. u. The operation was smooth and easily controlled in all respects and the coke produced was of high quality.

Example III

A coke, analyzing about 95% carbon, was introduced into the apparatus for gas production at a rate of 0.96 ton per day, 80 pounds per hour. A mixture of air and 44 pounds of steam per hour was introduced, the quantity of air added being controlled to maintain a gasification temperature of between 1900° F. and 2000° F. It was found that the gasification zone or combustion zone was easily maintained at its desired position. A producer gas containing about 8% carbon dioxide, 24% carbon monoxide, 9% hydrogen, and nitrogen was obtained at a rate of about 750 standard cubic feet per hour.

The process of this invention may be quite widely varied. The hydraulic drive of the positive solids feeder shown in Figure 1 may be altered to be driven with gears so that the reciprocating motion of the piston is coordinated with the oscillatory motion of the cylinder. It is preferred, however, to employ the hydraulic driving means shown. In such operations with moving cylinders, it is convenient to provide for the motion of the liquid in which the cylinders operate. This may be accomplished by a by-pass line between accumulation zone 21 and feeder zone 24, such as by lines 54 and 56 controlled by valves 55 and 57.

The process and apparatus of this invention as previously mentioned is principally directed toward the recovery of hydrocarbon gases and liquids from oil-producing and oil-containing solids. The process and apparatus has been particularly successful in the treatment of oil shales wherein a carbonaceous residue remains in the form of spent shale which is burned to supply heat for the process. In some instances, however, there may be insufficient carbon present in this residue to provide heat requirements for eduction. In this case heat may be supplied from an external source by burning a portion of the educted gases or even by supplying fuel gas from separate sources. In general, however, this is not necessary since with most shales treated, such as those from Colorado containing from as low as 20 to as high as 70 U. S. gallons per ton of oil, the amount of carbonaceous residue was sufficient to supply the required heat.

It is sometimes desirable to directly contact the ashes present in ash zone A of Figure 1 with either water or steam which is introduced with the oxygen-containing gas. The introduction of steam serves principally to supplement the volume of hot eduction medium employed in educting gases and liquids from the solids. The introduction of water in direct contact with hot ashes serves also to provide quantities of steam in addition to removing a substantial proportion of the sensible heat of ashes discharged.

The term "eduction" as employed in this specification is intended to include any means of treatment of oil-bearing or oil-containing solids including coals whereby oil is obtained therefrom.

In the practice of this invention the solid to be treated is preferably crushed to particle sizes between about 0.5 and 1.5 inches, although larger particles may be treated. It is characteristic of the apparatus of this invention that particles of quite small dimensions may be efficiently treated simultaneously with the larger particles. Solids fines as small as about 50 mesh and smaller may be handled. It is not necessary that the solids to be treated be screened to a particular particle size before being introduced into the apparatus in contrast to oil shale processing units known heretofore. It is to be noted that in actual operation of the present unit, the fines encountered are almost exclusively introduced as unclassified feed and are not formed in the apparatus.

The process and apparatus of this invention may be applied to the recovery of oil from other oil-bearing or oil-producing solids besides oil shale including various types of coal, tar sand, oil soaked diatomite, and the like. It may also be applied to the coking of coals, lignite, and similar materials. The process and apparatus is further adaptable substantially as described to the gasification of carbonaceous oil-bearing or oil-producing solids including coal, spent oil shale, tar sand, coke, cellulose-like materials such as peat, agricultural by-products such as corn husks, bagasse, and the like. The simultaneous eduction of oils and gas and gasification of the carbonaceous residue to form fuel or synthesis gas is also within the broad aspect of this invention.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A process for the recovery of oils and gases from oil-bearing solids such as oil shale which comprises passing said oil-bearing solids into a feeding zone, passing said solids from said feeding zone upwardly through a treating zone containing an eduction zone and a burning zone, contacting said solids in said eduction zone with a hot eduction medium to educt gases and liquids from said solids leaving a carbonaceous solid residue, contacting said residue in said burning zone with an oxygen-containing gas to form said hot education medium and leaving ashes, maintaining an annular layer of cool shale adjacent to said burning zone to protect the walls of the treating zone maintaining said burning zone at a constant position within said treating zone by controlling the rate at which gaseous products of eduction and combustion are withdrawn from said accumulation zone, passing gaseous and liquid products of eduction and products of combustion from said eduction zone into said accumulation zone wherein a level of liquid eduction products is maintained, removing gases and liquids therefrom and passing them to a reservoir zone, separating shale fines from said liquid eduction products forming a clarified liquid product, removing shale fines from said reservoir zone heating a portion of said clarified liquid product, circulating the heated liquid product through said accumulation zone to convey shale fines therefrom to said reservoir zone and removing the remaining portion of clarified liquid product from the system.

2. In a process for the recovery of educted oils and gases from oil-bearing solids which comprises establishing a feeder zone communicating with an accumulation zone and a treating zone, introducing said solids into said feeding zone, passing said solids upwardly through said treating zone, educting liquid and gaseous products of eduction from said solids by direct counter-current contact with a hot eduction medium leaving a carbonaceous residue, burning said residue to form said hot eduction medium, passing said educted liquids and gases and products of combustion into said accumulation zone wherein a liquid level of educted products is maintained, and removing liquids and gases therefrom, the improvement which comprises establishing a reservoir zone communicating with said accumulation zone, said reservoir zone adapted to separate solids fines suspended in said educted liquid to form a clarified eduction product, passing a portion of the clarified liquid thus formed downwardly through said feeder zone and back into said reservoir zone to maintain said feeder zone free of oil-bearing solids fines.

3. In a process for the treatment of oil-bearing solids for oil and gas recovery which comprises establishing a feeding zone communicating with an accumulation zone and a treating zone, introducing solids into said feeding zone, passing said solids from said feeding zone upwardly through said treating zone, educting liquid and gaseous products from said solids by direct counter-current contact with a hot eduction medium leaving a carbonaceous residue, contacting said residue with a gas containing oxygen thereby burning the carbonaceous residue forming said hot eduction medium, passing educted liquids and gases and products of combustion into said accumulation zone wherein a level of liquid eduction product is maintained, and removing liquids and gases therefrom, the improvement which comprises establishing a reservoir zone communicating with said accumulation zone, said reservoir zone being adapted to separate solids fines suspended in said educted liquid to form clarified educted liquid products, maintaining a circulation of clarified educted liquid products from said reservoir zone to said accumulation zone and fines-laden liquid products to said reservoir zone from said accumulation zone to remove oil-bearing solids fines therefrom, separating suspended solids fines from said liquid products in said reservoir zone, and separately withdrawing solids fines and clarified liquid products of eduction from said reservoir zone.

4. In a process for the recovery of educted oils and gases from oil-bearing solids which comprises establishing a feeder zone containing a reciprocating piston feeder, said feeder zone communicating with an accumulation zone and a treating zone, introducing said solids into said feeding zone, passing said solids upwardly through said treating zone, educting liquid and gaseous products of eduction from said solids by direct counter-current contact with a hot eduction medium leaving a carbonaceous residue, burning said residue to form said hot eduction medium, passing said educted liquids and gases and products of combustion into said accumulation zone wherein a liquid level of educted products is maintained, and removing liquids and gases therefrom, the improvement which comprises establishing a reservoir zone communicating with said accumulation zone, said reservoir zone adapted to separate solids fines suspended in said educted liquid to form a clarified eduction product, providing a fluid connection between the lower portion of said feeder zone and said reservoir zone terminating below respective liquid levels therein and adapted to carry a pulsating liquid flow therebetween, passing a stream of fines-free oil from said reservoir zone to said feeder zone through said fluid connection, and alternately withdrawing a liquid stream containing settled solids fines from said feeder zone to said reservoir zone.

5. A process for the recovery of oils and gases from oil-bearing solids such as oil shale which comprises passing said oil-bearing solids into a feeding zone, passing said solids from said feeding zone upwardly through a treating zone containing an eduction zone and a burning zone, contacting said solids in said eduction zone with a hot eduction medium to educt gases and liquids from said solids leaving a carbonaceous solid residue, contacting said residue in said burning zone with an oxygen-containing gas to form said hot eduction medium and leaving ashes, cooling the walls of said treating zone so as to maintain an annular layer of cool shale adjacent to said walls, passing gaseous and liquid products of eduction and products of combustion from said eduction zone into an accumulation zone wherein a level of liquid eduction products is maintained, removing gases and liquids therefrom, establishing a reservoir zone communicating with said accumulation zone, said reservoir zone adapted to settle solids fines suspended in said educted liquid product, passing a portion of the clarified liquid thus formed through said feeding zone and back to said reservoir zone to maintain said feeding zone free of oil-bearing solids fines.

6. An apparatus for recovery of oils and gases from oil-bearing or oil-producing solids which comprises a vertical treating kiln in which the oils and gases are educted from said solids, a vertically acting reciprocating feeder centrally located below said kiln and an accumulation chamber outside of the lower portion of said kiln, adapted to receive educted oils and gases and solids fines from said treating kiln through apertures therein, a reservoir adjacent to and communicating with said accumulation chamber and adapted to permit settling of suspended fines from liquid products therein to form clarified oil, means for drawing gases downwardly through said kiln, through said accumulation chamber and into said reservoir, means for circulating a portion of the clarified oil from said reservoir to said accumulation chamber, means for returning fines-laden liquid products from said accumulation chamber to said reservoir, and means for separately removing gas, clarified oil, and separated fines from said reservoir.

7. An apparatus according to claim 6 in combination with means for heating the clarified liquid circulated from said reservoir into said accumulation chamber, and in which the same liquid level is common to said accumulation chamber and said reservoir.

8. An apparatus according to claim 6 in combination with conduit means connecting clarified oil in said reservoir below the liquid level therein with fines-laden oil at a low point within said feeder housing, said means adapted to carry a pulsating liquid flow therebetween established by reciprocation of said feeder, said flow comprising clarified oil from said reservoir and fines-laden oil from said housing so as to prevent accumulation of fines in said feeder housing.

9. An apparatus according to claim 6 wherein said reciprocating feeder is positioned in a liquid-tight housing maintained full of liquid products and said accumulation zone contains a liquid level, in combination with means connecting said accumulation zone below said liquid level with said feeder housing, an indirect heating means submerged below said liquid level in said accumulation zone, and an indirect heating means in said feeder housing for heating liquid contained therein.

CLYDE H. O. BERG.

References Cited in the file of this patent

UNITED STATES PATENTS

| Number | Name | Date |
|---|---|---|
| 1,607,240 | Davis et al. | Nov. 16, 1926 |
| 1,607,241 | Davis et al. | Nov. 16, 1926 |
| 1,698,907 | Carr | Jan. 15, 1929 |
| 1,716,667 | Schilling et al. | June 11, 1929 |
| 1,793,838 | Carr et al. | Feb. 24, 1931 |
| 2,300,761 | Amy | Nov. 3, 1942 |
| 2,364,492 | Tuttle | Dec. 5, 1944 |
| 2,501,153 | Berg | Mar. 21, 1950 |